United States Patent [19]
Greene

[11] Patent Number: 5,692,004
[45] Date of Patent: Nov. 25, 1997

[54] LASER ADAPTABLE TO LIGHTWEIGHT CONSTRUCTION

[75] Inventor: Benny Allan Greene, Fadden, Australia

[73] Assignee: Electro Optic Systems Pty. Ltd., New South Wales, Australia

[21] Appl. No.: 513,788

[22] PCT Filed: Feb. 23, 1994

[86] PCT No.: PCT/AU94/00081

§ 371 Date: Dec. 22, 1995

§ 102(e) Date: Dec. 22, 1995

[87] PCT Pub. No.: WO94/19846

PCT Pub. Date: Sep. 1, 1994

[30] Foreign Application Priority Data

Feb. 23, 1993 [AU] Australia ............... PL 7462/93

[51] Int. Cl.$^6$ ............................................. H01S 3/09
[52] U.S. Cl. ................... 372/69; 372/25; 372/38; 372/92
[58] Field of Search ............... 372/69, 25, 38, 372/70, 92

[56] References Cited

U.S. PATENT DOCUMENTS

| | | | |
|---|---|---|---|
| 4,276,497 | 6/1981 | Burbeck et al. | 372/70 |
| 4,439,861 | 3/1984 | Bradford | 372/25 |
| 4,489,415 | 12/1984 | Jones, Jr. | 372/70 |
| 4,630,273 | 12/1986 | Inoue et al. | 372/38 |
| 4,685,107 | 8/1987 | Kafka et al. | 372/25 |
| 4,829,530 | 5/1989 | Sato et al. | 372/38 |
| 4,950,268 | 8/1990 | Rink | 372/38 |
| 4,972,423 | 11/1990 | Alfano et al. | 372/25 |
| 4,998,256 | 3/1991 | Ohshima et al. | 372/92 |
| 5,105,428 | 4/1992 | Pocholle et al. | 372/25 |
| 5,132,980 | 7/1992 | Connor et al. . | |
| 5,315,607 | 5/1994 | Nielsen | 372/38 |
| 5,406,577 | 4/1995 | Gagosz | 372/25 |
| 5,455,837 | 10/1995 | Negus et al. | 372/38 |
| 5,491,707 | 2/1996 | Reiger et al. | 372/25 |

OTHER PUBLICATIONS

Patent Abstracts of Japan, E–54, p. 61, referencing JP 56–12789, Feb. 7, 1981, to Tetsuo Harada (Nippon Denki K.K.).
Patent Abstracts of Japan, E–1285, p. 140, referencing JP 4–196375, Jul. 16, 1992, to Hiroo Takenaka (NEC Corp.).

*Primary Examiner*—Leon Scott, Jr.
*Attorney, Agent, or Firm*—Knobbe, Martens, Olson & Bear, LLP

[57] ABSTRACT

A laser assembly includes a lasing medium (12), associated reflector components (14, 16) defining a resonance cavity, and means (16) for outputting laser pulses therefrom. Means (18) is provided to pump the lasing medium with pulses of predetermined energy. There is a pumping circuit (20) for activating the pump means, and control means (22, 34, 35) associated with said pumping circuit for determining the energy of the pumping pulses.

17 Claims, 5 Drawing Sheets

LASER ADAPTABLE TO LIGHTWEIGHT CONSTRUCTION

FIELD OF THE INVENTION

This invention relates to lasers and has particular though not exclusive application to the construction and actuation of eye-safe laser devices.

BACKGROUND ART

In a known eye-safe laser assembly, an erbium glass rod of 75 mm length is pumped by a parallel flash lamp. The flash lamp power circuit includes one or more capacitive storage devices and a wound inductance in series with the lamp. The total weight of these assemblies, apart from any battery supply, is around 4 pounds (1.8 kg), a major contribution being from the inductance. The capacitors are typically also large in volume, and hence the flashlamp-pumped erbium glass configuration, although eye-safe and simple to operate, has limitations in application where small size and/or low weight are called for.

Another problem encountered with erbuim glass lasers is their susceptibility to thermal droop and the associated difficulty of achieving adequate control of their output energy within various limits. For a given energy input, $E_{iN}$, erbium glass lasers exhibit a decaying energy outlet as the temperature of the rod increases with successive pulses, and the temperature impulse response of the rod for each pulse has a half-life of the order of 100 seconds. On the other hand, there is a minimum output threshold for adequate operation, typically around 4 mJ per pulse. There are also two upper thresholds—the legal limit for eye-safe operation typically 8 mJ per pulse) and a higher limit above which the laser is rendered non-functional by double pulsing. The problem was to achieve an adequate repetition rate at a desired output energy while applying input energy of the appropriate level without exceeding the legal limit and without incurring double pulsing.

A further problem associated with prior art flashlamp-pumped solid state lasers has been their fragility. Employment of such lasers in high vibration or high impact load applications is not possible because either the glass flashlamp or the laser material will break.

One approach to meeting some of problems associated with flashlamp-pumped pumped erbium glass eye-safe lasers has been to substitute diode pumping. Diode pumping has allowed elimination of the wound inductance, thus reducing the weight, has obviated the problem of double pulsing, and has proven more energy efficient than flash pumping. However, a much larger (in volume) capacitance is needed and a diode pump costs of the order of twenty times more than a flashlamp pump. Thus, while diode pumped erbium glass eye-safe lasers have been produced, these units have proven expensive and have remained relatively heavy and bulky.

Prior art admits that small active volumes with short (e.g. 30 mm) gain lengths can provide useful pulse outputs (e.g. 7 mJ in 30 ns from erbium glass), but it completely ignores the strength benefits of carefully selected dimensions for the "fragile" components. This is because prior art assumes universally that thermal droop must be compensated for solely by increasing the gain length.

Prior art therefore overcame thermal droop by making the laser longer. This renders it more fragile, and requires more energy, lacking in passive LC pump networks which are bulky, heavy, electrically inefficient, and optically inefficient (because current density is not controlled).

SUMMARY OF THE INVENTION

It is an object of the invention to provide a laser assembly which is adaptable to the economic production of an eye-safe laser assemble that is lighter, stronger, more robust and preferably also less bulky than eye-safe lasers hitherto available.

It has been realised that a preferred embodiment of a lighter, stronger, more efficient, smaller, and less expensive eye-safe laser can be obtained by initially considering the following points:

- the mode volume of laser crystal required for useful operation (4 to 8 mJ), excluding thermal droop, is preferably less than 100 mm$^3$
- the gain length (round trip) required for efficient operation is desirably 40 to 60 mm.
- the stiffness (strength) of a laser crystal increases dramatically as its length is reduced for a given thickness. When the length/thickness ratio is less than 10, the crystal will withstand 100 g shock if correctly supported.
- the stiffness of a glass flashlamp similarly increases as length is reduced for a given wall thickness.
- Er:Glass has a stored energy lifetime which is typically ten times longer than conventional laser materials such as Nd:YAG. This allows Er:Glass lasers to be pumped with ten fold power reductions for the same stored energy and pulse output.

The invention accordingly provides, in one aspect, a laser assembly, preferably an eye-safe laser assembly, comprising:

a lasing medium, associated reflector components defining a resonance cavity, and means for outputting laser pulses therefrom;

means to pump the lasing medium with pulses of predetermined energy;

a pumping circuit for activating the pump means, preferably including an electrolytic capacitor for storing successive charges releasable to generate said pumping pulse; and control means associated with said pumping circuit for determining the energy of said pumping pulses, preferably in dependence upon a monitored temperature at a location in, on or adjacent the lasing medium and/or upon the pumped history of the medium within a predetermined preceding time period.

Preferably the control means is further arranged for controlling the current level of said pumping pulses.

The lasing medium is preferably an erbium glass rod, which is moreover preferably of length no greater than 4 mm, most preferably in the range of 10 to 30 mm. The pump means and lasing medium are preferably such that the maximum energy output is 8 mJ per pulse.

The electrolytic capacitor is advantageously less than half the weight of a conventional dielectric capacitor. The pumping circuit is, moreover, preferably a sold state circuit, most preferably without a wound inductive component or with only one or more miniature inductive components. The lasing medium is preferably small enough for the pumping discharge from the capacitor to entail a limiting current below 100 A.

The laser assembly preferably includes means to monitor the temperature at a location in, on or adjacent the lasing medium. The temperature is preferably monitored at a location on the surface of the lasing medium. This temperature is related to the core temperature but a conclusion as to the core temperature is dependent on the temporal proximity of preceding pump pulses. The temperature impulse response of the medium exhibits a half-life of the order of 100 seconds. Hence, the control of the energy of each pump pulse requires knowledge of both medium temperature and recent pump history. The control means preferably includes a pre-programmed table providing preferred pulse energy levels for given temperature and recent pumping history inputs, having regard to selected criteria such as minimum energy output for proper laser operation, maximum energy output for eye-safe operation, and maximum energy output if double pulsing is to be avoided.

Where activation of the pump means requires a threshold priming current profile, e.g. where the pump means is a flash lamp, the control means and charging circuit may apply a continuous low-level simmer current to the pump means. Preferably, however, for portable battered-powered use of the assembly, the control means and pumping circuit may be configured to precede each main pump pulse with a simmer pulse which primes the pump means with the necessary threshold current profile and simmer current but at a current level well below the current level of the main pump pulse.

Indeed, in a fourth aspect, the invention more generally provides a laser assembly, preferably an eye-safe laser assembly, comprising:

a lasing medium, associated reflector components defining a resonance cavity, and means for outputting laser pulses therefrom;

means to pump the lasing medium with pulses of predetermined energy, which pump means requires a threshold current profile for proper activation; and means to activate the pump means, which means is configured to precede each main pump pulse with a pre-simmer pulse which primes the pump means with the necessary threshold current profile and simmer current but at a current level well below the current level of the main pump pulse.

BRIEF DESCRIPTION OF THE DRAWINGS

The invention will now be further described, by way of example only, with reference to the accompanying drawings, in which.

BEST MODE(S) OF CARRYING OUT THE INVENTION

Figure 1:
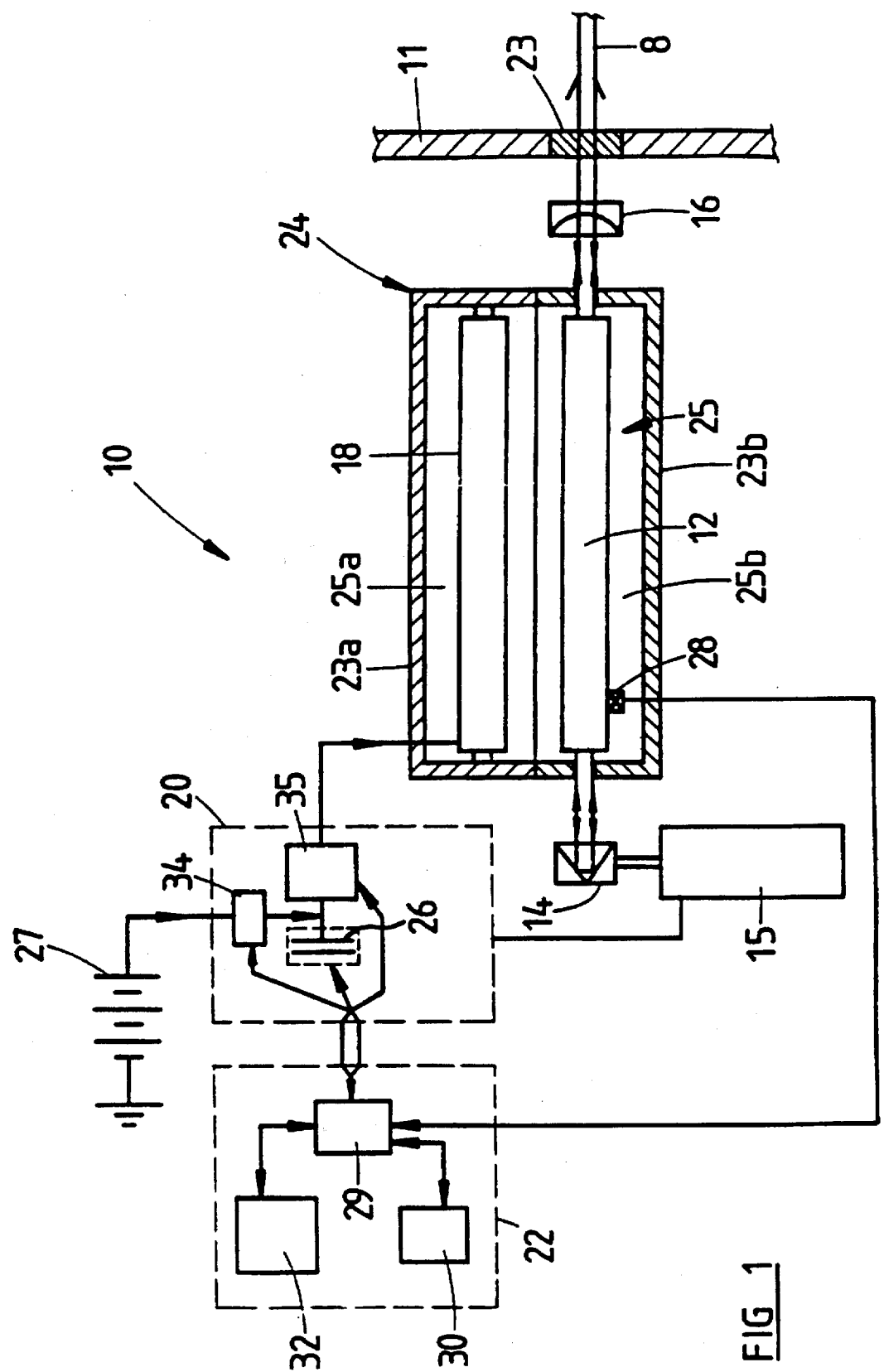
FIG. 1 is a simple block diagram of a portable eye-safe laser assembly according to an embodiment of the invention.
Figure 2:
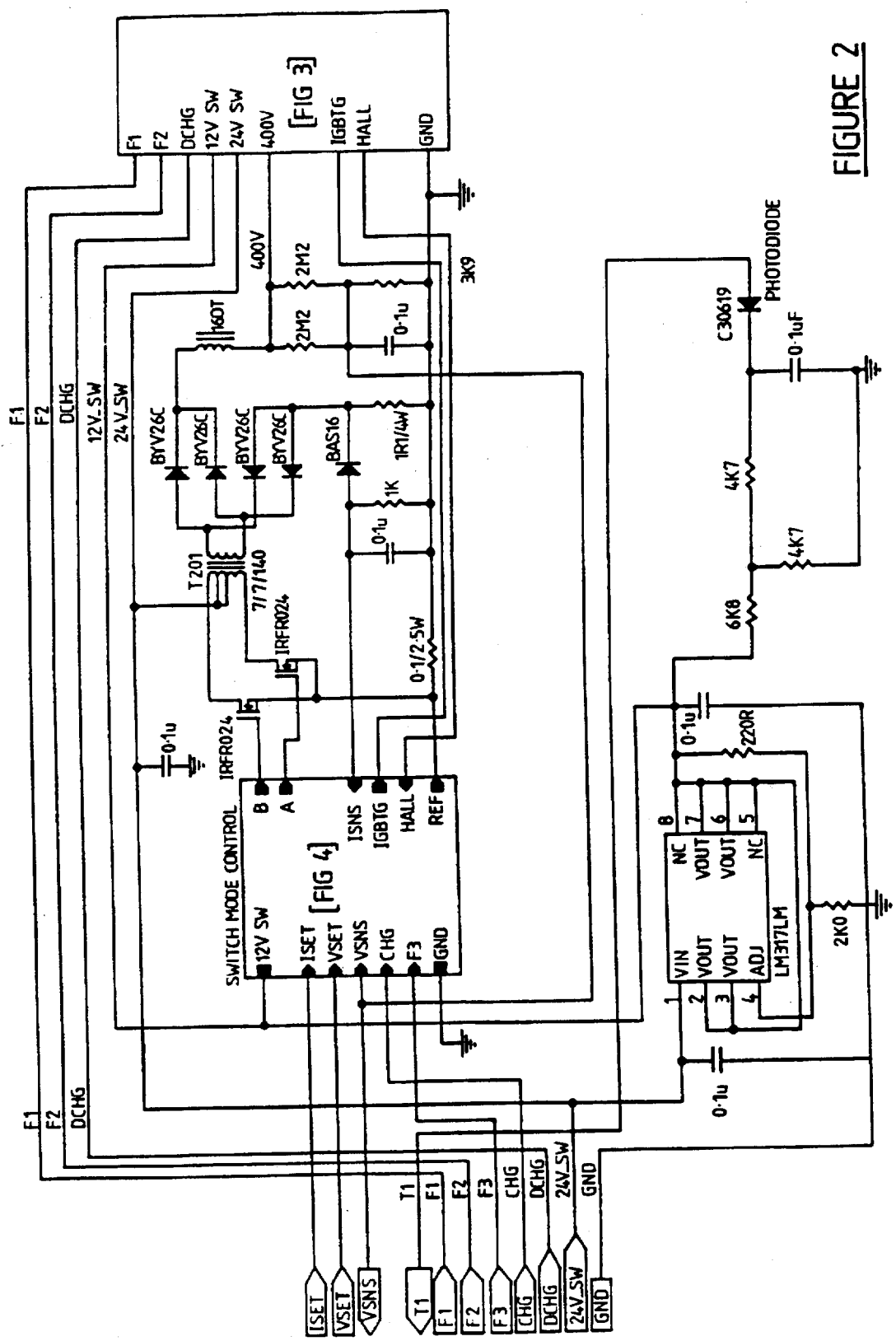
FIGS. 2 to 5 are circuit diagrams for the pumping circuit indicated in FIG. 1
Figure 3:
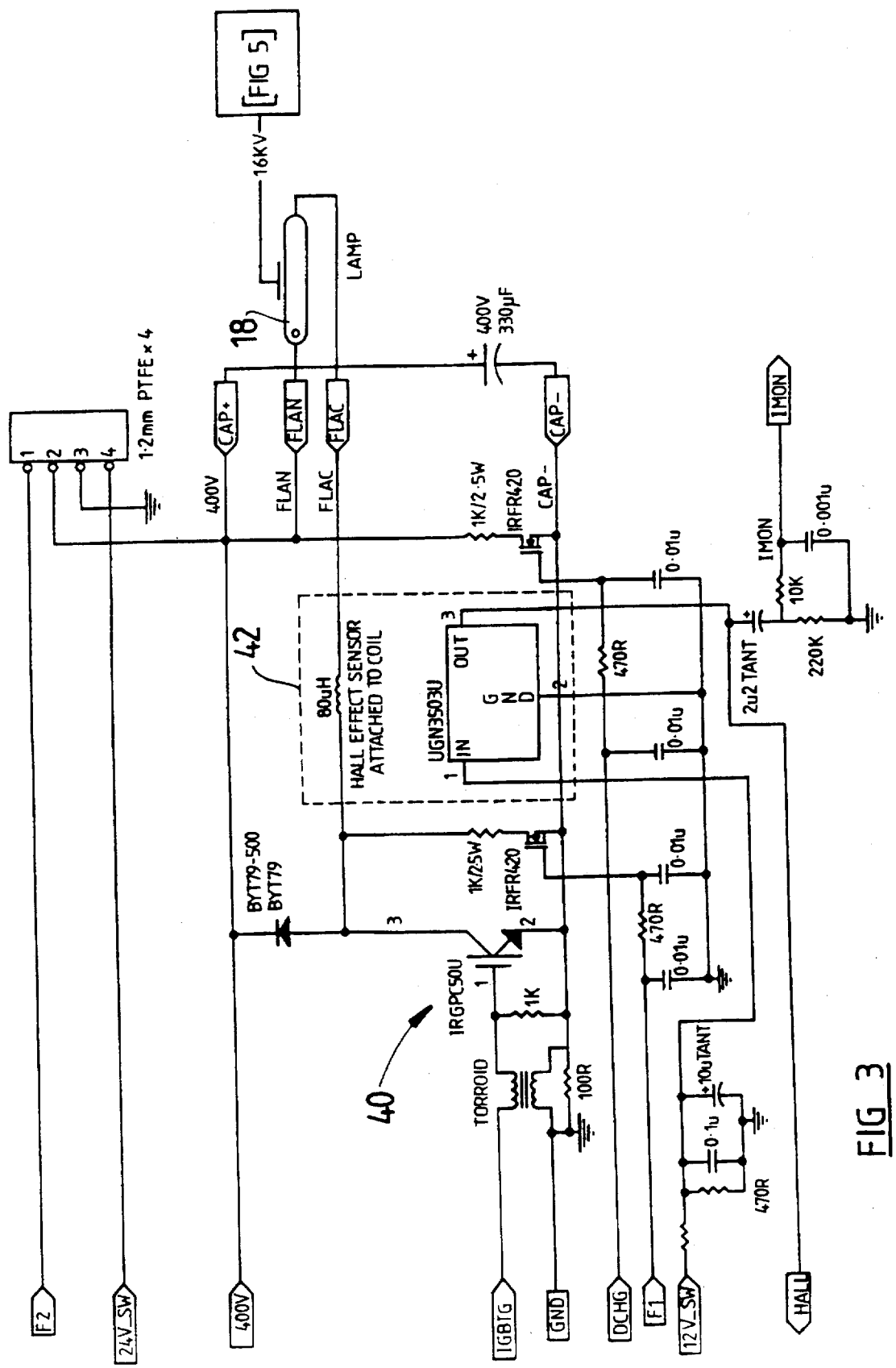
Figure 4:
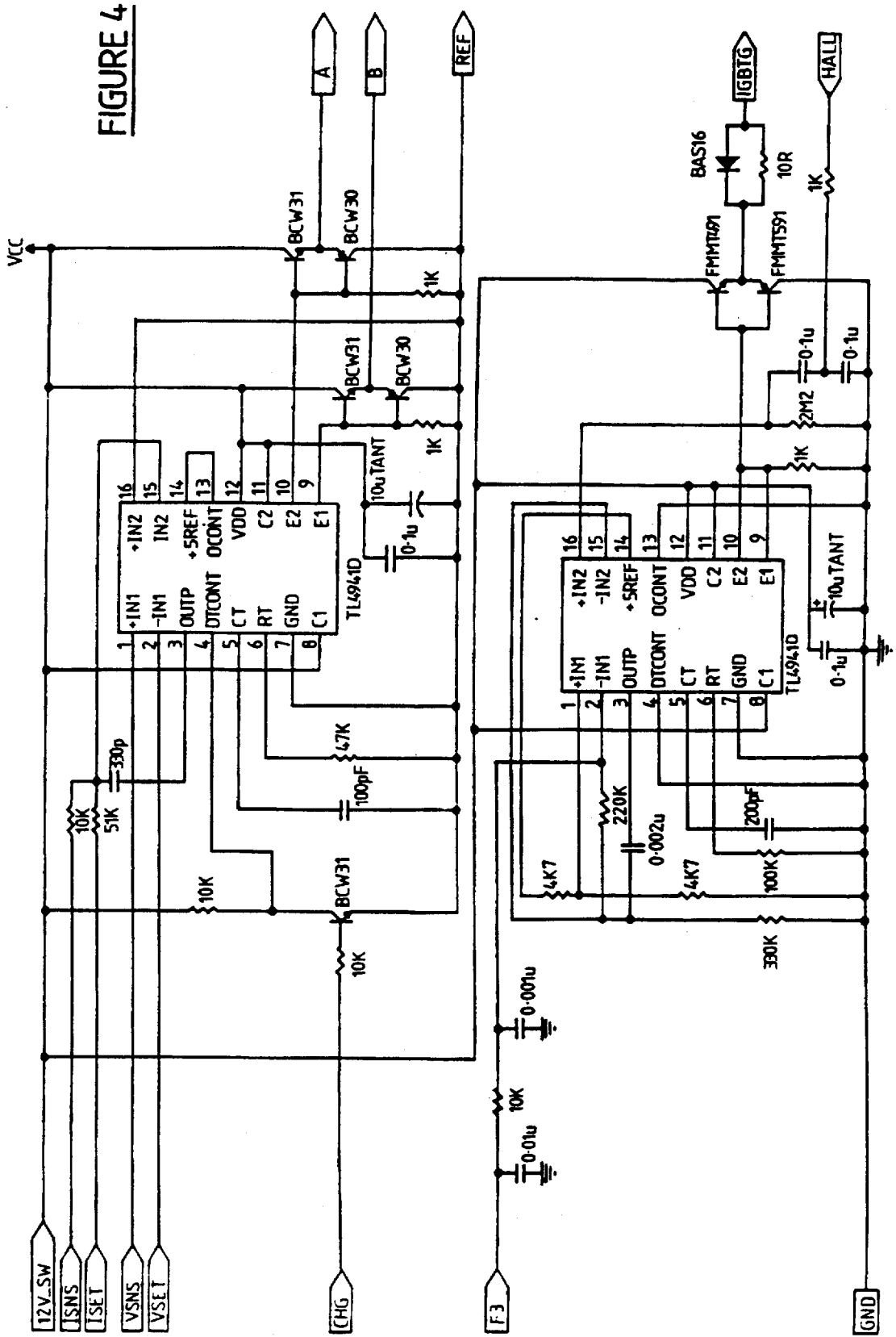

The illustrated laser assembly 10 includes a rod 12 of leasing medium, in this case erbium glass, reflector components 14, 16 defining a resonance cavity including rod 12, pumping means in the form of an elongate flash lamp 18, a pumping circuit 20 for the flash lamp, and a control circuit 22 including a microprocessor based CPU 29. The whole assembly is typically mounted within an outer housing 11, whose dimensions will be discussed subsequently.

Erbium glass rod 12 is a size, i.e. length, selected to allow the pumping energy requirement to be reduced to a level (e.g. 20 J) at which capacitive components of the charging circuit may be electrolytic rather than dielectric. To this end, the rod is typically 30 mm is length and both it and flash lamp 18, which extends beside and for the full length of the rod, are retained within a cavity 25 provided by a solid aluminum casing 24 formed of two assembled halves 23a, 23b, The exterior of casing 24 exhibits a rectangular box profile but the interior comprises opposed polished longitudinally extending surfaces 25a, 25b which together define an ellipse in cross-section. The foci are coincident with the axes of rod 12 and lamp 18. Other known cavity arrangements may of course be substituted, but it is thought that the solid box proposed may provide a sufficient combination of thermal capacity and thermal conductivity to prevent overheating of cavity 25.

The reflector components are conventional and include a rotatable prism mirror 14 at one end, driven by motor 15, and partially reflective mirror 16 at the other end, which also thereby provides a window for outputting generated laser pulses 8. Mirror 16 may be concave. These pulses traverse a further window 23 in housing 11.

Pumping circuit 20 is configured for reliance on an external battery pack 27 and includes an electrolytic storage capacitor 26 but is otherwise provided by solid state components. In particular, the conventional wound inductance (the heaviest component of conventional flash pumped erbium glass lasers) is omitted. The solid state circuit may included miniature inductive components.

The pumping circuit 20 draws a programmable current from the battery pack 27 to charge storage capacitor 26. The current drawn from the battery is programmable at sub-circuit 34 by the CPU 29 to optimise battery lifetime for portable applications. The voltage to which the capacitor is charged is also controlled by the CPU, giving accurate energy control. Combined with the vastly reduced input energy requirements and the enhanced efficiency of the lamp pump, this feature multiples battery life.

When the storage capacitor is charged (0.1 to 10.0 secs, depending upon charge current selected), and the laser is fired, the capacitor energy is switched to the flashlamp via a current control sub-circuit 35. Once an energy has been selected (i.e. capacitor voltage), the duration of the lamp discharge is controlled by current to the flashlamp which can be set and therefore controlled by the CPU.

Figure 5:
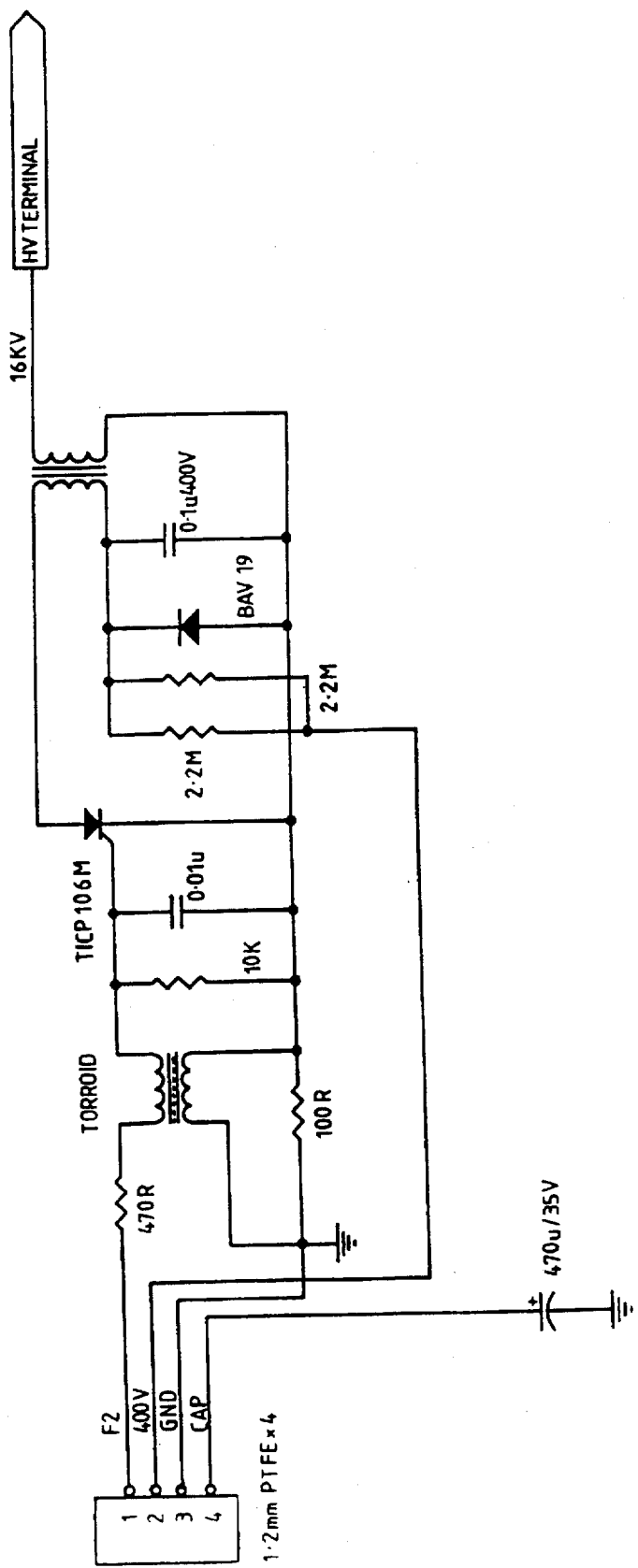

A few microseconds before the main current is switched to the flashlamp, a high voltage trigger (generated by the sub-circuit shown in FIG. 5) is transmitted to break down the lamp and establish lamp conduction with a low current level. This trigger technique is used to minimise noise feedback to the control electronics when the high current discharge begins.

More detailed circuit diagrams for pumping circuit 20 are to be found in FIGS. 2 to 5. In the pumping circuit 20 the current control element is an IGBT 40 (FIG. 3) controlled by a comparator whose inputs are the flashlamp current as sensed by a Hall effect device 42 or shunt resistance, and the required current at any particular time within the discharge, as output from the command circuit. The command circuit may be a simple look-up table of time dependent current or an actively computed current level.

The pumping circuit 20 obtains power through a switch mode power supply (FIG. 4) connected directly to the battery. The battery current limit is determined from time to time by the central processor 29 so as to smooth the current demand on the battery from all sources.

This information is fed to one input of a comparator which in turn controls the set-up transformer of the switch mode power supply. The second comparator input is drawn from the resistor which senses current drawn from the battery.

The circuit 20 acts as a controlled current source for the lamp. A major advantage over passive LC circuits is that the vast majority of the stored energy is released, vs a minority for passive circuits. Sub-circuits 34, 35 may be of any known suitable for incorporating standard solid-state integrated components.

Control circuit 22 is incorporated to provide intelligent control of the energy level of the pump pulses in dependence upon monitored temperature and/or upon the pumped history of the medium within a predetermined preceding time period. To this end, a temperature sensor 28 is mounted to the surface of rod 12. Recent pumping history is provided in a simple manner by maintaining a continously updated memory record 30 in the microprocessor of the number of pumping pulses fired by the flash lamp in the immediately preceding two minutes: this time is selected to be longer than the thermal time constant (e.g. 100 sec) of the temperature impulse response of the erbium glass rod. A more complex history (e.g. summation of instantaneous responses for recorded pulses within a preceding time period) could be maintained if desired for an enhanced level of history. The control circuit maintains a pre-programmed "look-up" table 32 of preferred flash pumping pulse energy levels in relation to monitored rod surface temperature at sensor 28 and to the recent pump history as indicated by the contents of record 30.

Look-up table 32 is based on the empirically established energy-temperature thermal droop diagram for the specific erbium glass rod 12. For any given pump energy input $E_{iN}$, the output energy of successive pulses diminishes with rising rod core temperature unless there is a sufficient delay (e.g. tow minutes) which takes account of the temperature impulse profile for the rod. Thus, to maintain energy output at a practical repetition rate and/or above the minimum operating threshold $E_{omin}$, the energy input of successive pulses must be increased and/or the current density of the lamp discharge, and the discharge time, varied. However, in an eye-safe environment, this must be done without exceeding the eye-safe threshold $E_{omax}$, and in general without incurring double pulsing, which occurs above another, usually higher, threshold $E_{odp}$. For example, for a typical erbium glass rod, $E_{omin}$ may be 4 mJ, $E_{omax}$ 8 mJ and $E_{odp}$ 10 mJ. Thus, table 32 is designed to select the most appropriate $E_{iN}$ given the monitored temperature and the recent pump history having regard to selected criteria such as minimum energy output for proper laser operation, maximum energy output for eye-safe operation, and maximum energy output if double pulsing is to be avoided, the recent pump history taking account of differences between the monitored rod surface temperature and the core temperature. The preferred $E_{iN}$ may of course be based on differing criteria and/or differing priorities, depending on the application of the laser.

Circuits 20, 22 are also configured so that each main pump charging pulse applied to flash lamp 18 by sub-circuit 35 is preceded by a simmer pulse which primes the lamp with the necessary threshold current profile and simmer current, but at a current level well below the current level of the main pump pulse.

An optimum laser assembly constructed in accordance with FIG. 1 has been found to have a total weight, including an outer aluminum housing, of the order of one pound (0.45 kg). The housing 11 of the optimum assembly has dimensions of 110 mm×80 mm×30 mm. This compares with a typical commercial eye-safe erbium glass laser, which weighs around four pounds (1.8 kg) and is of ten times greater volume. It will be apparent that a laser assembly in accordance with the invention has wide application where a laser is required as part of personally carried or otherwise portable equipment, e.g. in laser rangefinders for infantry weaponry.

The advantages of the preferred embodiment can be further appreciated by taking account of the following interrelated considerations:

the smaller the laser, the stronger its "fragile" parts become an optimised (minimal) size requires less than 13 Joules of energy input ($E_{IN}$) to produce useful output, before thermal droop such low $E_{IN}$ requirements can be met by ultra-light and small energy storage components such as electrolytic capacitors (capacitor 26 in FIG. 1)

flashlamp efficiency studies show that for a properly designed flashlamp, efficiency of pumping will depend upon current density optimised current densities for optimised flashlamps pumping low energy (i.e. less than 13 Joules) will be less than 100 A at any instant current below 100 A (peak) can be actively controlled (at sub-circuit 35) by state-of-the-art solid state components such as IGBTs with the current controlled at sub-circuit 35, the flashlamp efficiency can be increased to optimum, reducing the onset of thermal droop, and minimising its effect with both the current and energy controlled at sub-circuits 34, 35, the entire pumping circuit 20 can be adjusted to compensate for thermal droop by using CPU 29 to increasing pump energy, or to alter the temporal characteristics of the current discharge, or both active current control removes the need for the largest and heaviest component of conventional laser power supplies, the wound inductor active current control allows almost all the energy stored in the energy storage capacitor 26 to be utilised, whereas a conventional passive LC circuit releases a minority of the stored energy. This feature allows further component shrinkage.

the system memory 30 which as mentioned preferably retains information for longer than the thermal time constant (e.g. 100 sec) of the laser medium, is used to adjust pumping parameters to stabilise output against thermal droop.

I claim:
1. A laser assembly comprising:
   a lasing medium, associated reflector components defining a resonant cavity for said laser, and means for outputting laser pulses therefrom;
   means to pump the lasing medium with pumping pulses of predetermined energy;
   a pumping circuit for activating the pump means; and
   control means associated with said pumping circuit for determining the energy of said pumping pulses in dependence upon a monitored temperature at a location in, on or adjacent the lasing medium.
2. A laser assembly according to claim 1 wherein said control means includes a pre-programmed table providing preferred pulse energy levels for given temperature and recent pumping history inputs.
3. A laser assembly according to claim 2 wherein the pulse energy levels are determined according to one or more of minimum energy output for proper laser operation, maximum energy output for eyesafe operation, and maximum energy output without double pulsing.

4. A laser assembly according to claim 1 wherein said control means is further arranged for controlling the current level of said pumping pulses.

5. A laser assembly according to claim 1 wherein said pumping circuit includes electrolytic capacitor for storing successive charges releasable as a pumping discharge to generate said pumping pulses.

6. A laser assembly according to claim 5 wherein the lasing medium is dimensional to operate with the pumping discharge from said capacitor having a limited current below 100 A.

7. A laser assembly according to claim 1 wherein said pumping circuit is a solid state circuit.

8. A laser assembly according to claim 1 wherein the frequency of said laser pulses output by the assembly are such that the laser assembly is eyesafe.

9. A laser assembly according to claim 1 wherein the pump means and lasing medium, and said energy of the pumping pulses, produce laser pulses with a maximum energy output of 8 mJ per pulse.

10. A laser assembly according to claim 1 wherein said lasing medium is an erbium glass rod.

11. A laser assembly according to claim 1 wherein the said lasing medium is a rod of length no greater than 40 mm.

12. A laser assembly according to claim 11 wherein said length is in the range of 10 to 30 mm.

13. A laser assembly according to claim 1 further including means to provide said monitored temperature at a location in, on or adjacent the lasing medium.

14. A laser assembly according to claim 1, wherein said temperature monitor means is disposed to monitor the temperature at a location on the surface of the lasing medium.

15. A laser assembly according to claim 1 wherein the control means and pumping circuit include means to provide a main pump pulse of selected current level each preceded by a simmer pulse which primes the pump means with a threshold current profile and simmer current but at a current level well below the current level of the main pump pulse.

16. A laser assembly comprising:

a lasing medium, associated reflector components defining a resonant cavity for said laser, and means for outputting laser pulses therefrom;

means to pump the lasing medium with pumping pulses of predetermined energy;

a pumping circuit for activating the pump means; and control means associated with said pumping circuit for determining the energy of said pumping pulses in dependence upon a history of said pumping pulses delivered to the medium within a predetermined preceding time period.

17. A laser medium assembly comprising:

a laser medium, associated reflector components defining a resonant cavity for said laser, and means for outputting laser pulses therefrom:

means to pump the lasing medium with pumping pulses of predetermined energy;

a pumping circuit for activating the pump means; and control means associated with said pumping circuit for determining the energy of said pumping pulses in dependence upon a monitored temperature at a location in, on or adjacent the lasing medium and upon a history of said pumping pulses delivered to the medium within a predetermined preceding time period.

* * * * *